Patented June 1, 1948

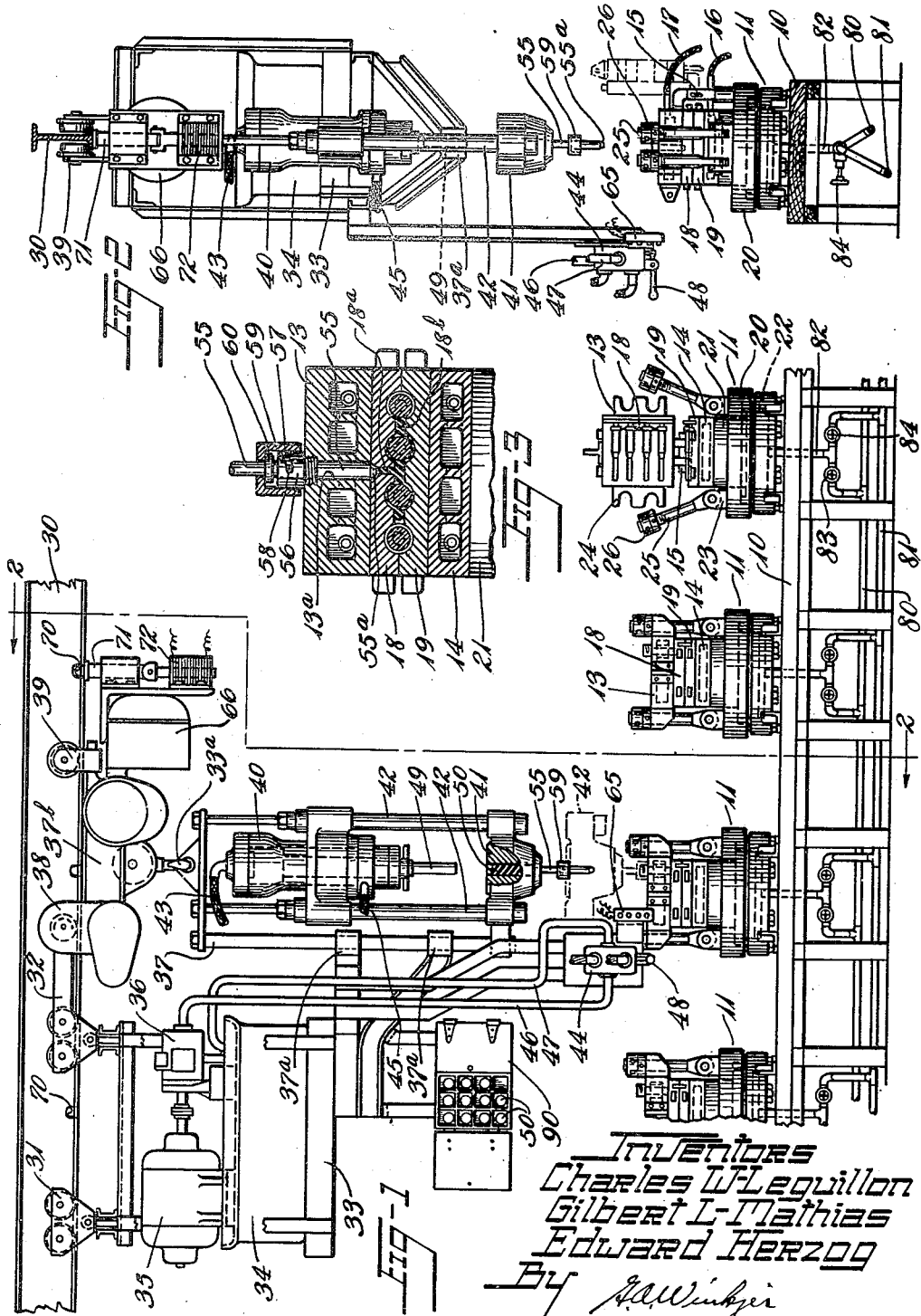

2,442,607

UNITED STATES PATENT OFFICE 2,442,607

APPARATUS FOR MOLDING ARTICLES FROM PLASTIC MATERIAL

Charles W. Leguillon, Akron, Gilbert L. Matthias, Silver Lake, and Edward Herzog, Cuyahoga Falls, Ohio, assignors to The B. F. Goodrich Company, New York, N. Y., a corporation of New York Application November 6, 1944, Serial No. 562,090

16 Claims. (Cl. 18—30)

This invention relates to the molding of articles from plastic material and is especially useful in molding articles of rubber composition or other rubber-like materials requiring vulcanization in the molding operation, although features of the invention are useful also in the molding of other thermosetting materials, and in general plastic materials requiring heat treatment in the molding thereof.

In the manufacture of molded articles of rubber or other rubber-like material blanks of unvulcanized material having slightly larger volume than that of the article have been introduced in cavities formed between heated mold plates, and hydraulic pressure has been applied to the plates to close the mold while vulcanization was accomplished by heat applied to the material from the mold plates enclosing it. Excess material has been forced between the mold plates where it has formed a rind on the article and has resulted in preventing proper closing of the mold resulting in variations in thickness of the articles. As the heat has been applied to the article from without and the material of the article has been of a heat-insulating nature, uniform vulcanization throughout the article has been difficult.

The molding of articles of rubber-like material, as heretofore practiced, has required considerable handling of molds in loading and unloading the hydraulic presses and has required considerable work in connection with preparation of the blanks prior to the molding operation.

Objects of the invention are to avoid the foregoing and other difficulties, to eliminate moving of molds, to provide a single mobile mold-loading apparatus for a plurality of stationary molds, to provide convenience of mold manipulation, to provide for preheating of the material, to provide accuracy of product and to reduce waste.

These and other objects will appear from the following description and the accompanying drawings.

Of the drawings,

Fig. 1 is a side elevation of apparatus made in accordance with and embodying the invention, portions being broken away and parts being sectioned, Fig. 2 is a sectional view thereof taken on line 2—2 of Fig. 1, and Fig. 3 is a cross-sectional view of a mold.

Referring to the drawings, the numeral 10 designates a table having a plurality of similar molding units 11 fixed thereto. Each molding unit has an upper platen 13 and a lower platen 14 hinged to each other by slotted hinge connections 15. The platens are formed with steam cavities for heating them and these are connected to a source of steam (not shown) by flexible hose connections 16, 17. Mold plates 18, 19 are removably secured to the platens 13, 14 respectively. Mounted on the table is a base member 20. A pressure-applying ram 21 is slidably mounted in an opening in the top of the base and the platen 14 is secured thereto. The base 20 is formed with a cavity beneath the ram 21 in which an inflatable pressure device such as a bag 22 is located.

Fixed to the base member 20 are ears 23. Platen 13 is formed with notched projections 24. Tension rods 25 are hinged to ears 23 and are adapted to engage in the notches between projections 24. Adjustable stop nuts 26 on the rods 25 engage over the top of the projections. The arrangement is such that with the tension rods engaged in the notches, the upper platen is held in fixed relation to the base member 20 and pressure may be applied to the mold by inflating the bag 22. Also when pressure in the bag 22 is released, tension is released from tension rods 25 so that they may be swung outwardly, releasing the top platen. The top platen may then be swung aside on hinges 15 opening the mold.

For filling the closed mold with rubber-like material, an I-beam rail 30 extends horizontally over the molding units. Trolleys 31, 32 suspend a frame 33 on which is supported means for developing hydraulic pressure. As shown this includes a tank 34 of liquid, a motor 35 and a high pressure pump 36 connected thereto. A second frame 37 is adjustably guided in a vertical direction in guides 37a, 37a of frame 33 and is suspended as by a hook 33a of a chain or cable from an electrically operated crane 37b in turn suspended from the rail by trolleys 38, 39. Mounted on the frame 37 is a hydraulic cylinder 40 and therebelow a cylinder 41 for receiving a supply of plastic material, the two cylinders being held in spaced-apart relation by tension rods 42. Cylinder 40 is of the double-acting type and its upper end is connected by a flexible hose 43 through a three-way valve 44 with the pump 36. Its lower end is connected by a flexible hose 45 through the same valve with the pressure supply.

A pressure line 46 extends from the pump 36 to the valve 44. A return pipe 47 connects the valve with the supply tank 34. The arrangement is such that by manipulating a valve lever 48 on valve 44 to one position, a ram 49 in the cylinder 40 is lowered and enters cylinder 41, and in a second position of the lever, the ram 49 is raised out of cylinder 41. The ram 49 has a close fit in cylinder 41 and is adapted to compress material 50 placed in cylinder 41.

Cylinder 41 has a nozzle 55 connected therewith. Platen 13 has a vertical passage 13a therethrough connecting with a sprue hole 18a in the upper mold plate (Fig. 3). Runner passages 18b are formed in the mold plate to connect the sprue hole with the mold cavities which in the illustrated embodiment are of a shape to mold rubber inflations for milking machines, a product as to which the elimination of mold rind is especially desirable.

The nozzle 55 is inserted through the vertical passage 13a and the conical end 55a of the nozzle bears in a conical seat in upper mold plate 18. A hollow coupling member 56, through which the nozzle 55 passes, has a threaded connection with the mold 13 and a bayonet slot connection 57 with one or more pins 58 on a coupling cap 59 which is rotatably mounted on the nozzle 55 and retained by a collar 60. Thus the nozzle may be inserted in the mold and detachably locked to it for a filling operation.

For adjusting the mold filling unit, a push button control panel 65 is located on the frame 37 near the valve 44 and through suitable relay circuits (not shown) controls the motor 66 of the electric crane 37b. The arrangement is such that by push button control the crane and with it the hydraulic pressure unit and filling unit may be moved in either direction along the track to align the nozzle with a desired mold and the nozzle may also be raised and lowered by the hoist through hook 33a to enter and remove it from the coupling member 56. If desired the I-beam rail 30 may be notched or apertured at stations as at 70 and a detent 71, controlled as by a solenoid 72, may be employed to stop the crane positively at successive stations with the filling nozzle in alignment with the respective mold openings.

For supplying pressure to the pressure bags 22, respective high and low pressure hydraulic pipe lines 80, 81 extend from a pressure source (not shown) along the bench 10. Branches therefrom connect the lines to a pipe 82 connected to the bag 22, and valves 83, 84 are provided in the branch lines to control the pressure.

The cylinder 41 may if desired be provided with an electric heating unit or other heating means to preheat the material 50 for obtaining the desired degree of plasticity so that the mold will be thoroughly filled without requiring excessive pressures. Also, if desired, pieces of stock may be temporarily stored in a preheating cabinet 90 supported on the frame 33 for convenient access to obtain a uniformly plastic condition before their insertion in the cylinder 41. The heat for the cabinet 90 may be supplied electrically, preferably by the high frequency method.

The operation of the invention is as follows:

The empty molds are cleaned and closed by rotating the top platens about their hinges. The tension rods 25 are swung inwardly to engage over the top platen. Hydraulic pressure is then applied to inflate the bag 22 and thereby to hold the mold plates together against separation. Steam is admitted to the platens 13, 14 to heat the mold to the desired curing temperature. A quantity of unvulcanized rubber-like material 50 in the form of a solid cylinder, preferably uniformly warmed throughout for the sake of plasticity, is then inserted in the cylinder 41. The material may be provided in the cylinder form by a simple extruding operation, and cut to length. Where the cylinder 41 is provided with heating means the cylinder may be kept warm at a temperature below the temperature at which vulcanization would occur to maintain the desired degree of plasticity of the material. The crane 37b is then manipulated to align the nozzle 55 with the sprue hole and the filling unit is lowered to enter the nozzle in the coupling member 56. The bayonet joint collar 60 is turned to lock the nozzle to the platen 13. The valve 44 is then manipulated to deliver hydraulic pressure to the top of cylinder 40 and drain the lower portion thereof. This lowers the ram 49 into the cylinder 41, forcing the material 50 into the mold to fill it.

After the mold is filled, the hydraulic pressure is released from the top of cylinder 41 and applied to the lower end of the same cylinder to raise the ram 49. The bayonet joint collar 60 is rotated to unlock the connection. The crane 37b is then manipulated to raise the filling unit and move it along the track to a position over the next mold and the operation is repeated.

With the apparatus herein described the molds, which do not require to be moved, may be heated continuously, thereby making for economy, speed and convenience. The molding and vulcanizing operation is carried out in a number of the molds while other molds are being filled by the travelling filling apparatus which thus can be kept in operation continuously by providing a suitable number of molds for the operation.

Variations may be made without departing from the scope of the invention as defined by the following claims.

We claim:

1. Apparatus for mold-vulcanizing articles of rubber-like and other thermosetting plastic material, said apparatus comprising a support, a plurality of molds mounted at stations along said support each comprising separable parts defining between them a mold cavity and each mold in its closed condition having a charging opening, means for introducing said material through said opening, coupling means for securing said material introducing means to said mold during charging thereof, and means for moving the material-introducing means along said support in turn from the charging opening of a mold to the charging opening of another mold.

2. Apparatus for mold-vulcanizing articles of rubber-like and other thermosetting plastic material, said apparatus comprising a support, a plurality of molds mounted at stations along said support each having a mold cavity and a charging opening, means for introducing said material through said opening under pressure, coupling means for securing the material-introducing means to said mold during charging thereof, means for moving said material-introducing means along said support from a position over one mold to a position over another mold, and means for elevating and lowering said material-introducing means at a position over a mold for connecting and disconnecting it with the mold.

3. Apparatus for molding articles of rubber-like and other plastic thermosetting material comprising a separable mold having a sprue opening, means for holding the mold closed against internal pressure, means for heating the mold, a trolley movable horizontally above the mold, and a mold charging unit suspended from said trolley, said mold charging unit comprising a cylinder for confining plastic material, means for detachably connecting the cylinder to said mold, and pressure means for forcing plastic material from said cylinder into said mold.

4. Apparatus for molding articles of rubberlike and other plastic thermosetting material comprising a separable mold have a sprue opening, means for holding the mold closed against internal pressure, means for heating the mold, a trolley movable horizontally above the mold, and a mold charging unit suspended from said trolley, said mold charging unit comprising a cylinder for confining plastic material, means for detachably connecting the cylinder to said mold, and pressure means for forcing plastic material from said cylinder into said mold, said pressure means including a cylinder, a plunger in said cylinder adapted to engage the plastic material, and a source of hydraulic pressure for advancing said plunger.

5. Apparatus for molding articles of rubberlike and other thermosetting plastic material, said apparatus comprising a plurality of molds each having a mold cavity and a charging opening, means for supporting said molds, a moldcharging unit having means for forcing plastic material into a mold, means for suspending said unit above said molds, means for moving said unit from mold to mold, and means for releasably locking the mold-charging unit to the molds.

6. Apparatus for molding articles of rubberlike and other thermosetting plastic material, said apparatus comprising a plurality of molds each having a mold cavity and a charging opening, means for supporting said molds, a moldcharging unit having means for forcing plastic material into a mold, means for locking said unit to a mold against separation therefrom during a charging operation, means for suspending said unit above said molds, and means for moving said unit from mold to mold.

7. Apparatus for molding articles of rubberlike and other thermosetting plastic material, said apparatus comprising a mold having a mold cavity and a charging aperture communicating therewith, means for supporting said mold, releasable means for holding the mold closed against internal pressure, means for heating the mold, a trolley mounted for movement horizontally above the mold, and a mold charging unit suspended from said trolley, said mold charging unit comprising a chamber, a nozzle, means for forcing plastic material from said chamber through said nozzle, and said apparatus comprising also means for moving said charging means toward and from said mold in a manner to position said nozzle in alignment with said charging aperture and to shift said nozzle laterally out of alignment with said aperture.

8. Apparatus for molding articles of rubberlike and other thermosetting plastic material, said apparatus comprising a mold having a mold cavity and a charging aperture communicating therewith, releasable means for holding the mold closed against internal pressure, means for heating the mold, a trolley mounted for movement horizontally above the mold to and away from the same, and a mold charging unit suspended from said trolley comprising a chamber and having a nozzle and means for forcing plastic material from said chamber, and said trolley comprising means for lowering and raising said charging unit toward and from said mold to position said nozzle in alignment with said charging aperture and to remove the nozzle therefrom.

9. Apparatus for molding articles of rubberlike and other thermo-setting plastic material, said apparatus comprising a mold charging unit having a chamber, a nozzle communicating with the chamber and means for forcing plastic material from said chamber through said nozzle, said apparatus comprising also a support, a series of molds mounted on said support at stations along the same, each mold having a filling opening, said mold charging unit including said chamber, forcing means and nozzle being moveable along said support, and means for guiding said mold charging unit from station to station into alignment of its nozzle with the filling openings of said molds.

10. Apparatus for molding articles of rubberlike and other thermo-setting plastic material, said apparatus comprising a mold charging unit having a chamber, a nozzle communicating with the chamber and means for forcing plastic material from said chamber through said nozzle, said apparatus comprising also a support, a series of molds mounted on said support at stations along the same, each mold having a filling opening, means for simultaneously heating all said molds, said mold charging unit being moveable along said support, and means for guiding said mold charging unit from station to station into alignment of its nozzle with said filling openings.

11. Apparatus for molding articles of rubberlike and other thermo-setting plastic material, said apparatus comprising a mold charging unit having a chamber, a nozzle communicating with the chamber and means for forcing plastic material from said chamber through said nozzle, said apparatus comprising also a support, a series of molds mounted on said support at stations along the same, each mold having a filling opening, and a rail extending along said support, said mold charging unit being mounted on said rail for support thereon and for movement from station to station to position said charging unit in alignment of its nozzle with said filling openings.

12. Apparatus for molding articles of rubberlike and other thermo-setting plastic material, said apparatus comprising a mold charging unit having a chamber, a nozzle communicating with the chamber and means for forcing plastic material from said chamber through said nozzle, said apparatus comprising also a support, a series of molds mounted on said support at stations along the same and each having a filling opening, a rail extending along said support, said mold charging unit being moveable along said rail from station to station to position said nozzle in alignment with said filling openings, and means for releasably locking said charging unit to said rail at each station.

13. Apparatus for molding articles of rubberlike and other thermo-setting plastic material, said apparatus comprising a mold charging unit having a chamber, a nozzle communicating with the chamber and means for forcing plastic material from said chamber through said nozzle, said apparatus comprising also a series of molding stations, a rail extending from station to station, said mold charging unit being guided by said rail for movement from station to station to position said charging unit into alignment of its nozzle with said filling openings.

14. Apparatus for molding articles of rubber-like and other thermo-setting plastic material, said apparatus comprising a mold charging unit having a chamber, a nozzle communicating with the chamber and means for forcing plastic material from said chamber through said nozzle, said apparatus comprising also a series of molding stations, a rail extending from station to station over said molds, said mold charging unit being supported as a trolley on said rail for movement from station to station to position said charging unit into alignment of its nozzle with said filling openings.

15. Apparatus for molding articles of rubber-like and other thermo-setting plastic materials, said apparatus comprising a support, a series of stationary molds having separable mold sections mounted on said support at stations along the same, each mold having a filling opening, means for heating the mold, means for holding the mold closed against internal pressure, a rail extending along said support, and a mold charging unit moveable along said rail from station to station, said charging unit comprising a chamber, a nozzle communicating with said chamber and means for forcing plastic material from said chamber through said nozzle.

16. Apparatus for molding articles of rubber-like and other thermo-setting plastic materials, said apparatus comprising a support, a series of stationary molds having separable mold sections mounted on said support at stations along the same, each mold having a filling opening, means for heating the mold, means for holding the mold closed against internal pressure, a rail extending along said support, and a mold charging unit moveable along said rail from station to station, said charging unit comprising a chamber, a nozzle communicating with said chamber, means for forcing plastic material from said chamber through said nozzle, and means for moving said charging unit including said chamber, nozzle and forcing means along said rail from station to station to align said nozzle with the filling openings of said molds.

CHARLES W. LEGUILLON.
GILBERT L. MATTHIAS.
EDWARD HERZOG.

REFERENCES CITED

The following references are of record in the file of this patent:

UNITED STATES PATENTS

| Number | Name | Date |
|---|---|---|
| 521,753 | Adams | June 19, 1894 |
| 1,674,387 | Campbell | June 19, 1928 |
| 2,112,342 | Lester | Mar. 29, 1938 |
| 2,202,797 | Hoge et al. | May 28, 1940 |
| 2,272,220 | Morin et al. | Feb. 10, 1942 |
| 2,293,304 | Muller et al. | Aug. 18, 1942 |
| 2,332,678 | Tucher | Oct. 26, 1943 |
| 2,351,774 | McGowan | June 20, 1944 |
| 2,356,634 | Von Opel | Aug. 22, 1944 |